C. H. RUSSELL.
BED CONSTRUCTION.
APPLICATION FILED MAY 27, 1916.
1,238,441.
Patented Aug. 28, 1917.
3 SHEETS—SHEET 1.
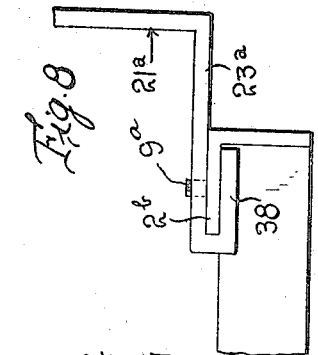
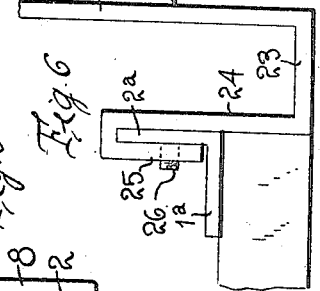
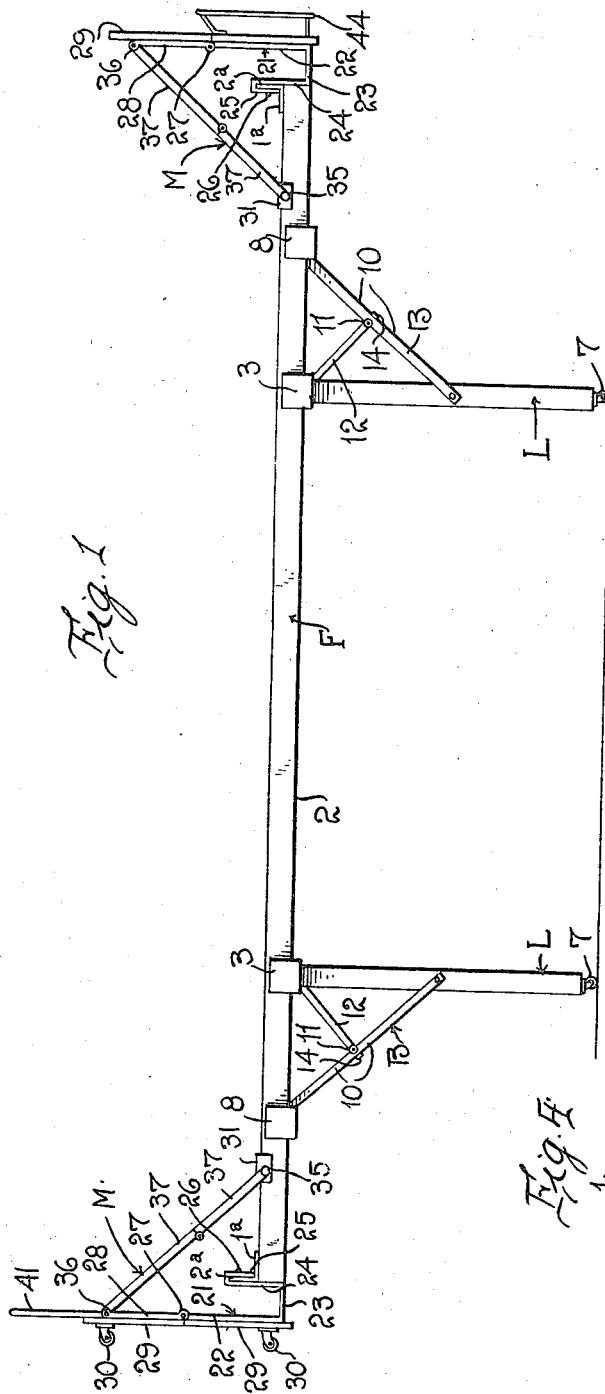
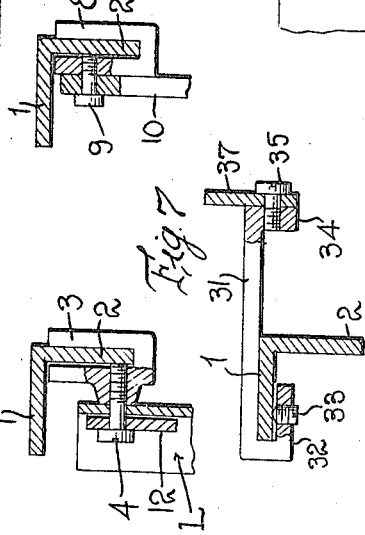
Inventor
C. H. Russell
By Watson E. Coleman
Attorney

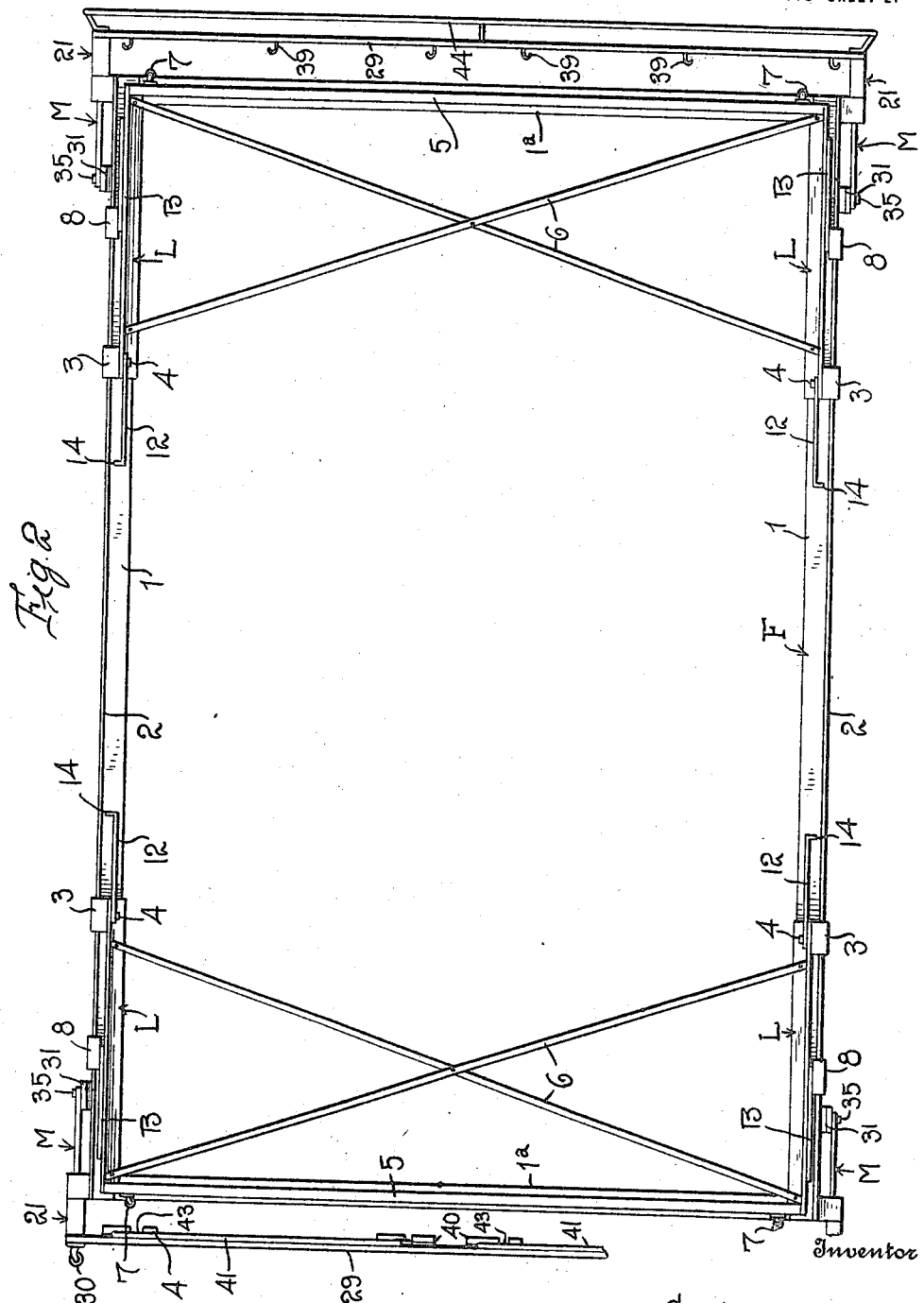

C. H. RUSSELL.
BED CONSTRUCTION.
APPLICATION FILED MAY 27, 1916.
1,238,441.
Patented Aug. 28, 1917.
3 SHEETS—SHEET 3.
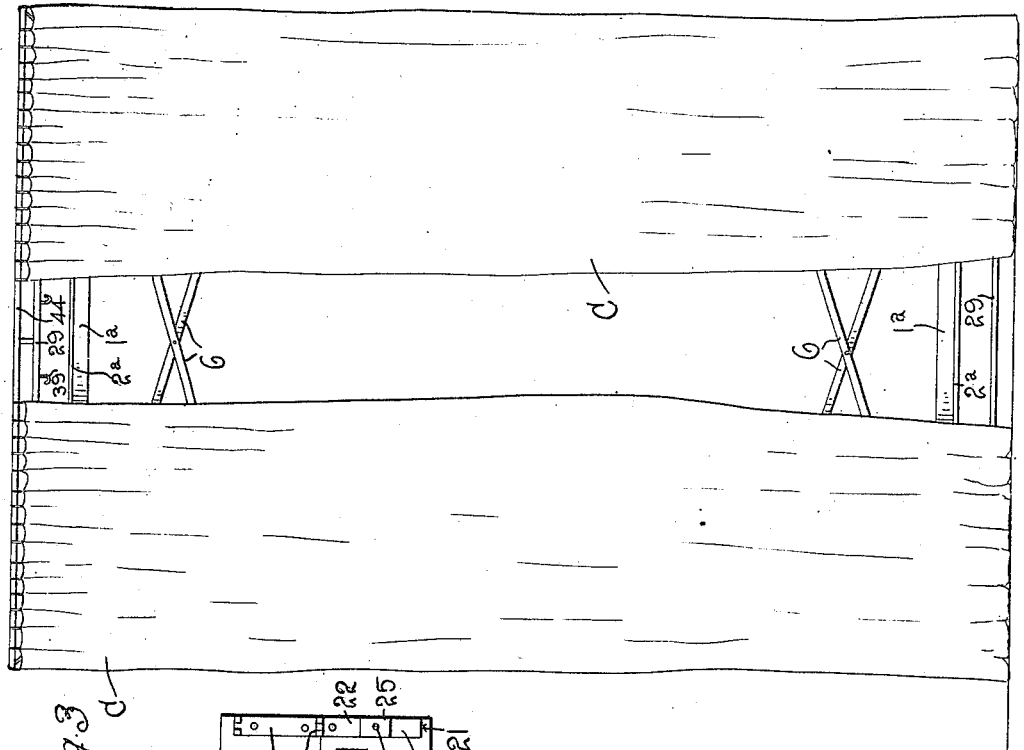
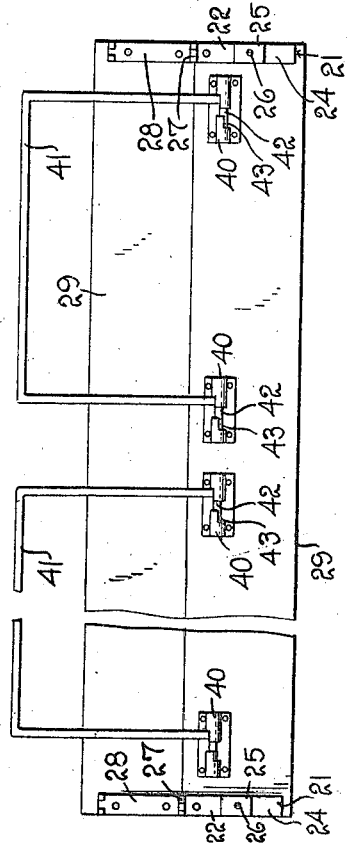
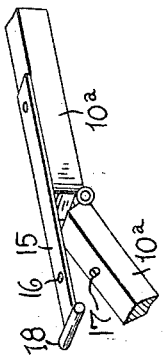
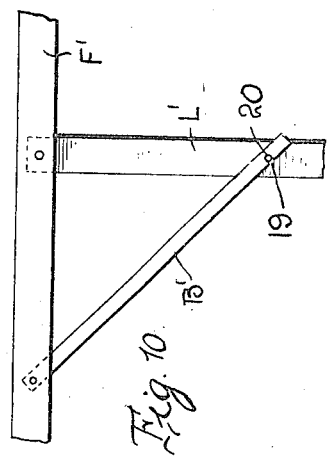
Inventor
C. H. RUSSELL
By Watson E. Coleman
Attorney

UNITED STATES PATENT OFFICE.

CHARLES H. RUSSELL, OF LOWELL, ARIZONA.

BED CONSTRUCTION.

1,238,441. Specification of Letters Patent. Patented Aug. 28, 1917.

Application filed May 27, 1916. Serial No. 100,293.

*To all whom it may concern:*

Be it known that I, CHARLES H. RUSSELL, a citizen of the United States, residing at Lowell, in the county of Cochise and State of Arizona, have invented certain new and useful Improvement in Bed Construction, of which the following is a specification, reference being had to the accompanying drawings.

This invention relates to certain improvements in bed constructions and it is an object of the invention to provide a novel and improved bed which may be caused to occupy a minimum of space when not in use.

Furthermore it is an object of the invention to provide a novel and improved bed construction wherein a plurality of attachments may be applied to a bed spring of a conventional type to convert the same into a foldable bed.

The invention consists in the details of construction and in the combination and arrangement of the several parts of my improved bed construction whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in side elevation illustrating a bed construction arranged in accordance with an embodiment of my invention;

Fig. 2 is a view in bottom plan with parts broken away of the device as disclosed in Fig. 1 and with the supporting legs folded into an inoperative position;

Fig. 3 is a view in elevation of the device when folded and in an upright position together with the inclosing curtains, certain of the panels comprised in the head and foot construction being omitted for clarity in disclosure of certain of the details;

Fig. 4 is an enlarged fragmentary view partly in elevation and partly in section illustrating the pivotal block for one of the supporting legs together with the means for securing said block in applied position;

Fig. 5 is an enlarged fragmentary view partly in section and partly in elevation illustrating one of the blocks with which a brace member for a supporting leg coacts and also showing the manner in which said block is applied in operative position;

Fig. 6 is an enlarged fragmentary view in elevation illustrating the mounting of one of the supporting brackets as herein embodied;

Fig. 7 is an enlarged fragmentary view partly in elevation and partly in section illustrating the mounting of one of the plates with which a brace member for one of the pivotal panels coacts;

Fig. 8 is an enlarged fragmentary view in elevation illustrating a modified form of bracket;

Fig. 9 is an enlarged fragmentary view in perspective illustrating a further embodiment of my invention as relates to maintaining the sections of a brace member for a supporting leg in assembled relation;

Fig. 10 is an enlarged fragmentary view in elevation illustrating a still further embodiment of my invention as relates to a supporting leg and the brace member therefor; and Fig. 11 is an elevational view illustrating the pillow supporting frames as herein embodied.

As disclosed in the accompanying drawings, F denotes a frame of a bed spring of conventional construction wherein the side and end members comprise angle irons of an L type and wherein the horizontal flanges 1 of the side members are arranged at the top and inwardly disposed with the end members having their horizontally disposed flanges 1ª resting upon the horizontal flanges 1 and suitably secured thereto, the vertical flanges 2ª of said end members being upwardly directed relative to the side members.

3—3 denote a plurality of blocks preferably two in number adapted to be detachably engaged with the depending vertical flange 2 of each of the side members, and as herein embodied, each of said blocks 3 is substantially U-shape in form and adapted to straddle the depending flange 2, and threaded through each of said blocks 3 and preferably through the inner side thereof is the clamping screw 4 coacting with the depending flange 2 in a manner and for a purpose which is believed to be clearly set forth in the accompanying drawings. The screw 4 also serves as a pivot for a supporting leg L also preferably formed of angle iron and of an L type.

In practice it is preferred that the blocks 3 be positioned a material distance inwardly of the adjacent ends of the side members of the frame F as it has been fully demonstrated in practice that with the supporting legs L thus positioned, the device may be handled with greater facility and convenience and especially when it is desired to change its location.

The blocks 3 of one side member of the frame are in transverse alinement with the blocks coacting with the opposite side member, and the lower or free extremities of the transversely alined legs L are tied or connected by the interposed strip 5 preferably of wood, and said transversely alined legs L are also preferably reinforced by the transversely disposed rods 6 arranged in cross relation as is believed to be clearly shown in the accompanying drawings. The free ends of the legs L are also adapted to have secured thereto in any desired manner the casters 7 for a purpose which is believed to be self-evident.

Also secured to each of the side members of the frame F at a predetermined point intermediate a block 3 and the adjacent end of the side member, is a second block 8 also substantially U-shaped in form and straddling the vertical depending flange 2 and held in applied position through the medium of a set screw 9 or the like threaded through the inner side of said block adjacent the upper end thereof. The screw 9 serves as a pivot for the brace member B preferably embodying two hingedly connected sections 10 substantially of equal length, the lower end of said brace member B being pivotally engaged with the adjacent leg L at a predetermined point intermediate the length thereof. It will be perceived that the hinge connection 11 between the members 10 is such as to cause said members to fold downwardly upon the elevation of the leg L into an inoperative position and the pivotal connection of the member with the leg L and the block 8 permit said folded brace member to lie above the leg L when said leg is adjusted into a position substantially parallel with the coacting side member of the frame. Furthermore it is to be understood that in folding the leg L into inoperative position, it is swung upwardly toward the adjacent end of the side member of the frame.

In order to hold the sections 10 against accidental folding movement and thereby hold the leg L against accidental displacement, I find it of advantage to pivotally engage with the screw 4 an extremity of the flat spring 12, the opposite end portion being offset, as at 14, to afford a shoulder adapted to underlie the adjacent ends of the sections 10 when in extended or operative position.

However, I do not wish to be understood as limiting myself to the specific use of the flat spring 12 as hereinbefore set forth, as under certain conditions I deem it advisable to employ the construction illustrated in Fig. 9, wherein the inner end of one of the sections $10^a$ has secured to the under face thereof an extremity of the flat spring 15 of such a length as to underlie the adjacent extremity of the second section $10^a$ when said sections are in operative position or longitudinal alinement, and said underlying portion of the spring 15 is provided with a recess or opening 16 adapted to receive the extended portion of a pin 17 disposed through said second section $10^a$. The free end of the spring 15 is provided with the enlargement or head 18 whereby it may be readily and conveniently disengaged from the pin 17 when it is desired to fold the sections $10^a$ in order to elevate the leg coacting therewith.

In the form of invention illustrated in Fig. 10, a supporting leg L' is disclosed as pivoted directly to a side member of the frame F'. In this embodiment of my invention, the brace member B' is also pivoted directly to the side member of the frame and has its outer or free end portion provided with a notch 19 adapted to receive a lateral extension or pin 20 carried by the leg L' whereby the leg L' may be effectively braced in operative position.

Coacting with the upstanding or vertical flanges $2^a$ of each of the end members of the frame F and adjacent the opposite ends thereof, are the brackets 21. Each of said brackets 21 comprises a vertically disposed member 22 of predetermined dimensions and provided at its lower end with the inwardly directed arm 23 terminating in the upstanding member 24 having its upper or free end portion returned, as at 25, so that said upstanding member 24 may straddle the vertical or upstanding flange $2^a$.

Disposed through the returned portion 25 is the binding screw 26 coacting in a conventional manner with the vertical or upstanding flange $2^a$ in order to effectively maintain the bracket 21 in applied position.

The upper end portion of the vertically disposed member 22 has hingedly connected therewith, as at 27, an extension 28, and secured to the transversely alined vertically disposed members 22 and their extensions 28 are the panels 29 whereby the head and foot of the bed are afforded. The panels 29 affording the head of the bed have suitably secured thereto the casters 30 whereby the device when in an upright position may be readily transported in accordance with the necessities of practice. After the bed, when in an upright position, has been positioned adjacent a wall or other support, the extensions 28 may be folded inwardly whereby it will be perceived that the bed when not in use may be caused to occupy a minimum of space.

31 denotes plates adapted to be secured to the inwardly directed and horizontal flanges 1 of the side members and as herein embodied, each of said plates 31 has an end portion returned, as at 32, whereby said plate may be caused to straddle the inturned or horizontal flange 1, and disposed through said returned portion 32 is a binding screw 33 coacting with the flange 1 for a purpose which is believed to be clearly apparent. The plate 31 is of such a length as to extend a predetermined distance outwardly beyond the side member of the frame F and terminates in a depending lip or flange 34 with which is engaged the pivot bolt or screw 35.

Operatively engaged with the pivot bolt or screw 35 is the lower end of a brace member M, the opposite end of said brace member M being pivotally engaged, as at 36, with the outer or free end portion of the extension 28 of the adjacent bracket 21. The brace member M also comprises two hingedly connected sections 37 adapted to move upwardly when the extensions 28 are folded inwardly.

As illustrated in Fig. 8, the end member of the frame has its horizonally disposed flange 2$^b$ upwardly and inwardly disposed. In connection with this type of frame, the bracket 21$^a$ is substantially L-shape in form and has its horizontally disposed arm 23$^a$ returned, as indicated at 38. A binding or clamping screw 9$^a$ is threaded through the arm 23$^a$ to coact with the inwardly disposed horizontal flange 2$^b$ when said arm 23$^a$ and its returned portion 38 are operatively engaged or straddling the flange 2$^b$.

The inner faces of the panels 29 affording the foot of the bed are provided with the suspending members 39 to which the mattress and bed clothes are adapted to be engaged so that when the bed is in a vertical position, said mattress and bed clothes will be covered thereby. It will be perceived that by suspending the mattress and the bed clothing in this manner, permits a free circulation of air and thereby increases the sanitary benefits.

The panel 29 at the head carried by the members 22 has secured thereto the transversely alined sleeves 40 arranged in pairs and coacting with each pair is the frame 41 substantially U-shape in form and which is adapted to support a pillow when the device is in an upright position, the pillow being partially inserted through the frame. The free ends of the frame 41 are secured to a pintle 42 disposed through each of the sleeves 40 and also through a substantially Z-shape slot 43 in said sleeve, whereby it will be perceived that the frame may be maintained in an upright or depending position relative to the panel 29 by moving said frame endwise of the sleeves 40 after the same has been properly passed through the intermediate portion of the slot 43.

One of the panels affording the foot of the bed has operatively engaged therewith the rods 44 with which the curtains C are operatively engaged so that when the bed is folded and in a vertical position, the same may be substantially entirely inclosed.

From the foregoing description, it is thought to be obvious that a bed construction arranged in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles anl spirit thereof and for this reason I do not wish to be understood as limiting myself to the precise arrangement and formation of the several parts herein shown in carrying out my invention in practice.

I claim:

1. In combination with a bed frame, brackets detachably secured to the opposite ends thereof and extending at right angles thereto, an extension foldably carried by the outer end of each of the brackets, panels secured to the brackets and to the extensions thereof, and a foldable brace interposed between each extension and the frame.

2. In combination with a bed frame, brackets detachably secured to each end thereof, an extension pivotally engaged with each of said brackets, a plate detachably connected with the sides of the frame, and brace members interposed between the extensions and the plates, each of said brace members including pivotally connected sections.

3. In combination with a bed spring, blocks detachably engaged with the sides thereof, and supporting legs operatively engaged with the blocks.

4. In combination with a bed spring, blocks detachably engaged with the sides thereof, supporting legs operatively engaged with the blocks, and brace members interposed between each of the legs and a side member of the spring.

5. In combination with a bed spring, blocks detachably engaged with the side members thereof, legs pivotally engaged with the blocks, and foldable brace members interposed between each of the legs and a side member of the spring.

6. In combination with a bed spring, blocks detachably engaged with the side members thereof, legs pivotally engaged with the blocks, and foldable brace members interposed between each of the legs and a side member of the spring, the connection between the brace member and the spring being detachable.

7. In combination with a bed spring, blocks detachably engaged with the sides thereof at points inward of the ends of the spring, supporting legs pivotally engaged with said blocks, additional blocks detachably engaged with the sides of the frame at points intermediate the first named blocks and the adjacent ends of the frame, and brace members pivotally engaged with the supporting legs and with the last named blocks, each of said brace members being foldable.

8. In combination with a bed spring, blocks detachably engaged with the sides thereof at points inward of the ends of the spring, supporting legs pivotally engaged with said blocks, additional blocks detachably engaged with the sides of the frame at points intermediate the first named blocks and the adjacent ends of the frame, brace members pivotally engaged with the supporting legs and with the last named blocks, each of said brace members being foldable, and means coacting with the sections of each of the braces for normally holding the same against folding.

In testimony whereof I hereunto affix my signature in the presence of two witnesses.

CHARLES H. RUSSELL.

Witnesses:
J. R. McBAIN,
W. S. BRAKFIELD.

Copies of this patent may be obtained for five cents each, by addressing the "Commissioner of Patents, Washington, D. C."